US006968754B2

(12) United States Patent
Bandarra

(10) Patent No.: US 6,968,754 B2
(45) Date of Patent: Nov. 29, 2005

(54) SPACE MAXIMIZING MEANS FOR KEEPING OR STORING BICYCLES

(76) Inventor: Mario Jorge Leite Bandarra, Jorge Lemgruber Street, 110, Maua, Petropolis, RJ (BR), 25645-390

(*) Notice: Subject to any disclaimer, the term of this patent is extended or adjusted under 35 U.S.C. 154(b) by 0 days.

(21) Appl. No.: 10/105,792

(22) Filed: Mar. 26, 2002

(65) Prior Publication Data

US 2002/0148324 A1 Oct. 17, 2002

(30) Foreign Application Priority Data

Mar. 27, 2001 (BR) .......................................... 8100960 U

(51) Int. Cl.$^7$ ................................................. G05G 1/14
(52) U.S. Cl. ..................... 74/594.7; 74/594.1; 280/278; 280/287
(58) Field of Search ............................ 74/551.1–551.8, 74/594.1, 594.4, 594.7; 280/287, 259, 278

(56) References Cited

U.S. PATENT DOCUMENTS

| 599,978 | A | * | 3/1898 | Tanner ....................... 74/594.7 |
| 2,384,139 | A | * | 9/1945 | Schwinn .................... 74/594.7 |
| 4,429,890 | A | * | 2/1984 | Hon ........................... 280/259 |
| 4,440,414 | A | * | 4/1984 | Wang ......................... 280/287 |
| 4,634,138 | A | * | 1/1987 | Fryer et al. ................. 280/278 |
| 4,824,131 | A | * | 4/1989 | Thay .......................... 280/278 |
| 4,842,292 | A | * | 6/1989 | Wang ......................... 280/287 |

FOREIGN PATENT DOCUMENTS

| JP | 2-127184 | * | 5/1990 | ................ 74/551.7 |
| JP | 6-239282 | * | 8/1994 | ................ 74/551.7 |
| JP | 6-239283 | * | 8/1994 | ................ 74/551.7 |

* cited by examiner

Primary Examiner—Vinh T. Luong
(74) Attorney, Agent, or Firm—Dennison, Schultz, Dougherty & MacDonald

(57) ABSTRACT

A crank arm (1) is provided that is connected to the crank head (2) through an elastic rotation axis (6) and a lock axis (7) having a reduced diameter (D) in the middle of said lock axis (7), the crank arm (1) also comprises a lock device (4) that is connected to the push button (5) and both together are easily moved down and upward with the user's thumb to release and lock the crank arm (1) between its operative and folded position, when the lock device (4) is pulled down a retaining spring (3) is compressed allowing the upper end of the lock axis (7) to flush with the crank arm hole (H) and releasing the crank arm (1) to rotate freely along its longitudinal plane with a 180° rotation angle in relation to the elastic rotation axis (6), by releasing the lock device (4) to its upper position it will lock the crank arm (1) at its folded position, then the fixation of the pedal-sprocket on the head crank (2) is performed by means of a fastening nut (5) which fix the crank head (2) to any commercially available pedal-sprocket.

1 Claim, 4 Drawing Sheets

SPACE MAXIMIZING MEANS FOR KEEPING OR STORING BICYCLES

FIELD OF INVENTION

The present invention is related to an innovative system comprising some foldable parts of a generic bicycle, allowing a significant reduction in the necessary storage space, therefore maximizing the space required for that purpose.

BACKGROUND OF THE INVENTION

As it is well known, the space needed to store a bicycle, whether hanging or leaning against the wall, is the same as the width of its handlebar, usually between 55 and 60 cm. The standard width of the handlebars leads to a space loss, which gets worse when you need to store more than one bicycle, even if the direction of storage is alternated.

Another contributing factor to enlarge the space needed to store more than one bicycle are the pedals, which create an undesirable distance between bikes positioned side by side.

A similar and awkward situation occurs when we need to transport one, two, or more bicycles on a rear-mounted automobile bike rack.

The above mentioned problems could be solved by using folding bicycles.

SUMMARY OF THE INVENTION

The present utility model solves, in general, the problem caused by a lack of space for storing bicycles, by means of a system comprising foldable handlebars and cranks which fold in a fast and easy manner, that is, the parts which extend beyond their axles. According to the kit disclosed in this application, the presented foldable handlebar and folding cranks may be mounted to any bicycle of any size or type of rim. Therefore, a simple replacement of the original handlebar and cranks of any kind of bicycle to the handlebar and cranks of the present utility model will enable it to fold, even with or without a gear system.

As another advantage, the present utility model allows the fastening of the steering column when the handlebar is on its folded position, not allowing any oscillation of the front wheel, and facilitating its assembly and, therefore, transportation or storage on the roof rack of cars, on hanging racks on the wall or the rear racks of cars.

DRAWINGS OF THE PREFERRED EMBODIMENTS

Figure 1:
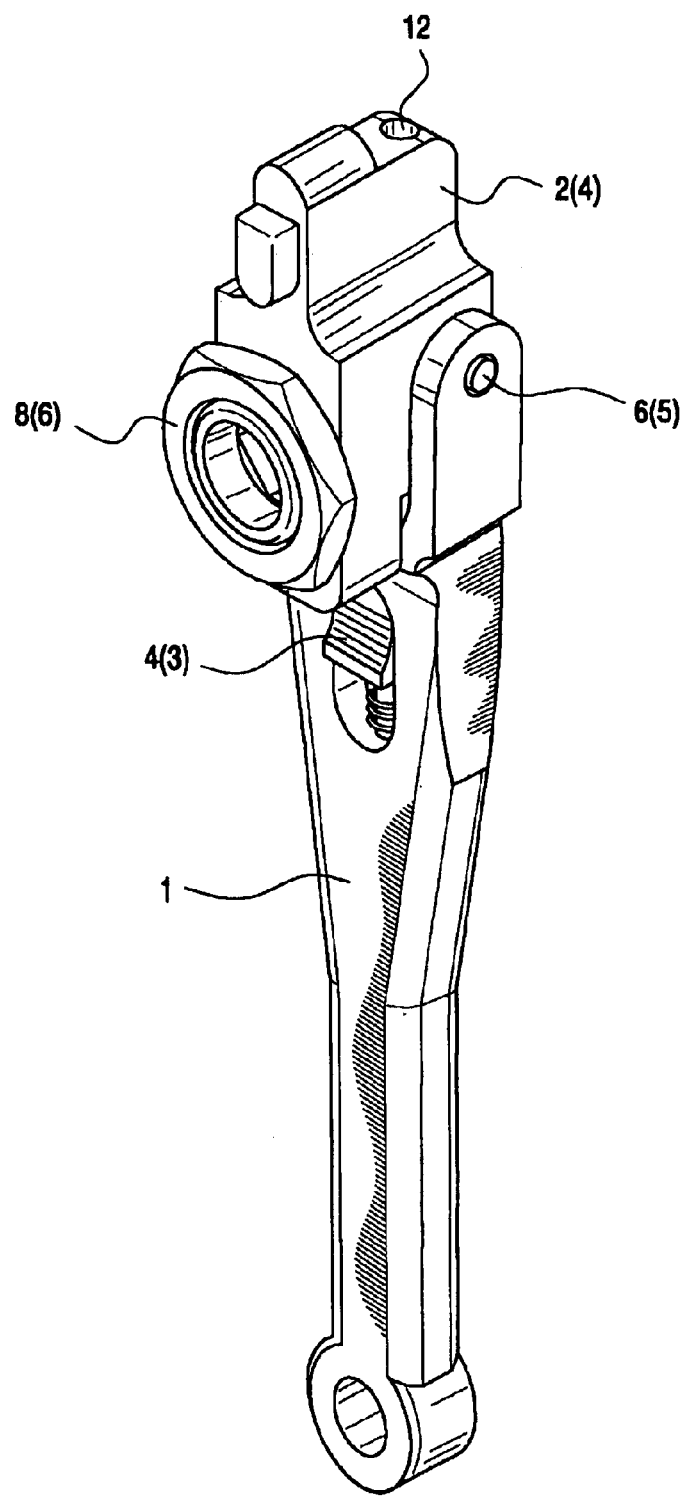
Figure 2:
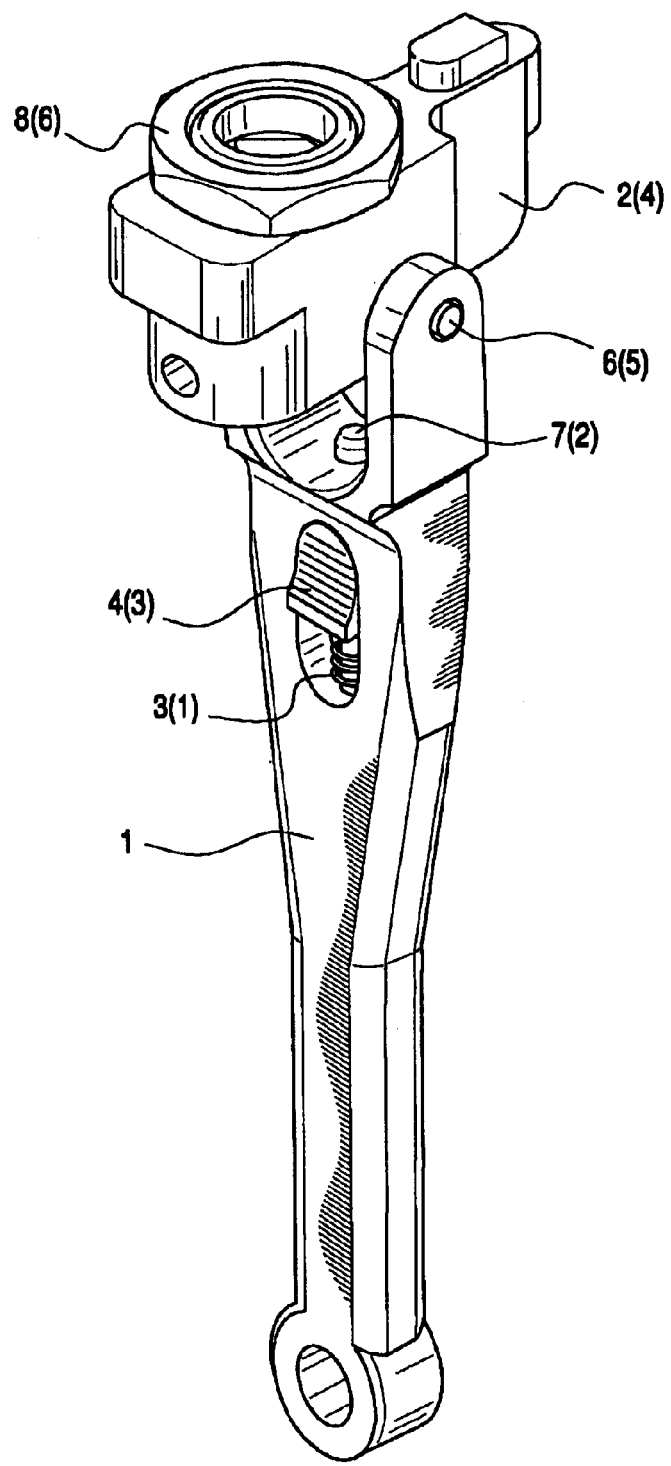
Figure 3:
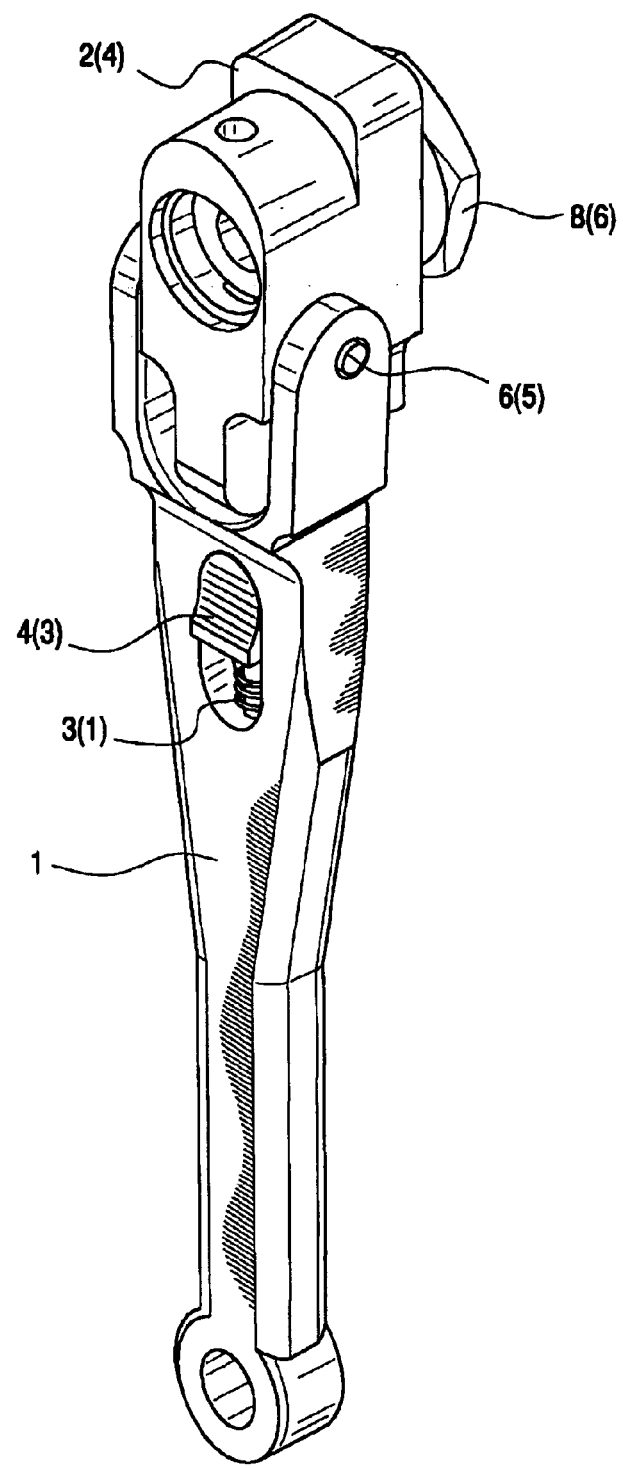
Figure 4:
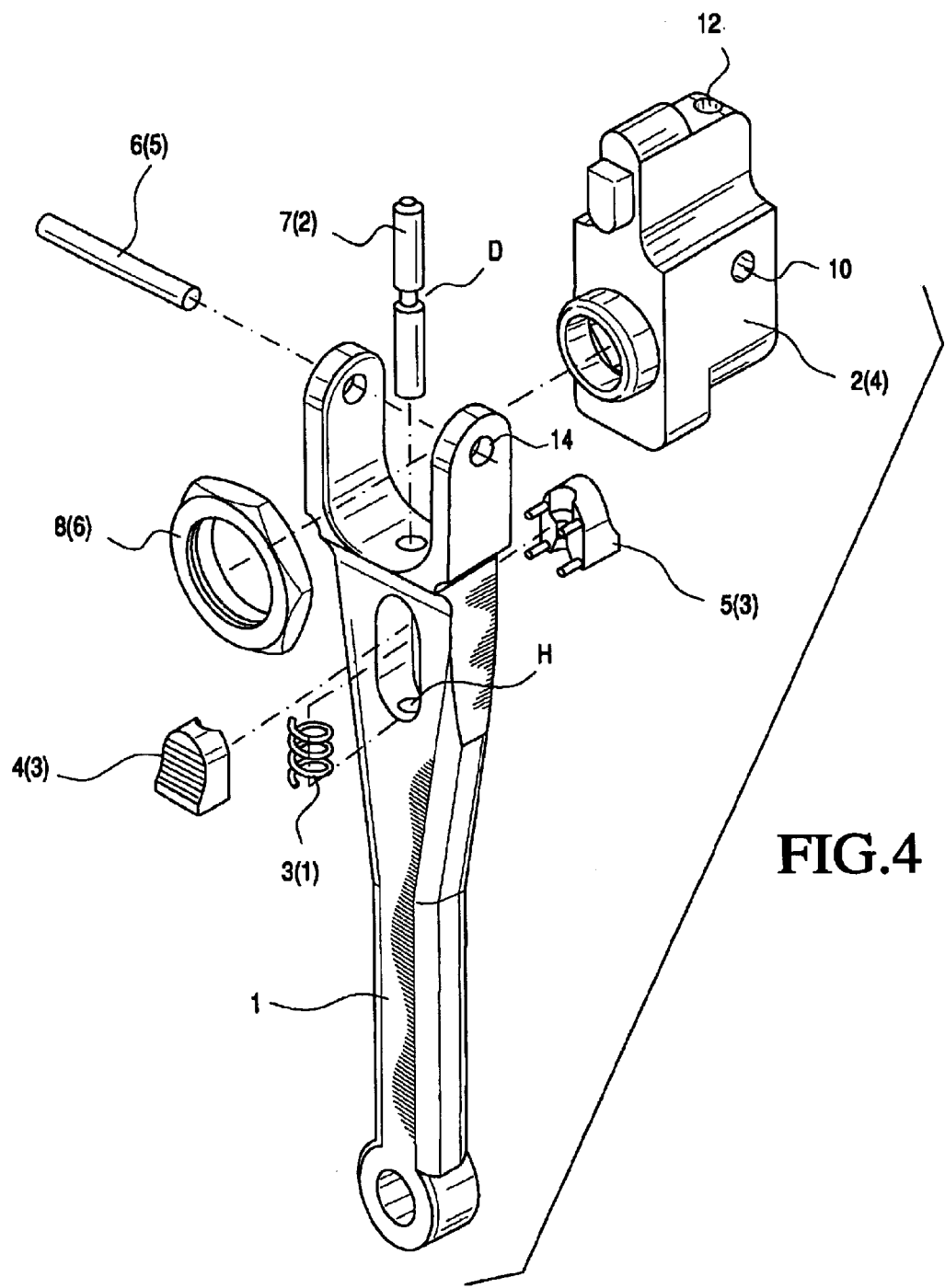

For a better understanding of the present utility model, the constructive features of a kit comprising a foldable handlebar and cranks, which may be mounted in any type of bicycle and its preferred embodiments are illustrated as follows:

FIG. 1—presents a perspective frontal view of the right crank without a pedal showing the crank arm at its operative position, FIG. 2—presents a perspective view of the right crank showing the crank arm at a 90° rotation angle, FIG. 3—presents a perspective view of the right crank showing the crank arm at its folded position with a 180° rotation angle, and FIG. 4—presents a exploded view of the right crank at its operative position.

DETAILED DESCRIPTION OF THE INVENTION

The present utility model refers to a kit comprising a foldable handlebar and a set of folding cranks. The foldable handlebars and cranks may be mounted in any type of bicycle, including conventional, folding or detachable bicycles, by simply removing the original cranks and handlebars from a bicycle and replacing them by the handlebars and the cranks of the present kit.

The right crank of the present invention are illustrated at FIGS. 1, 2 and 3 showing the crank arm (1) positioned at its operative position, at a 90° rotation angle position and at its folded position (with a rotation of 180°), respectively.

The right crank of the present invention illustrated at FIGS. 1 to 4 comprises a crank head (2) which can be easily mounted on any commercially available bicycle, without needing special tools to substitute this bicycle piece. A crank arm (1) being arranged with the crank head (2) such that said crank arm (2) is able to rotate along its longitudinal plane with a 180° rotation angle.

As illustrated in FIG. 4, the crank arm (1) is connected to the crank head (2) through an elastic rotation axis (6) and a lock axis (7) having a reduced diameter in the middle of said lock axis (7). The crank arm (1) includes a first horizontal bore (14) in an upper portion thereof for receiving the elastic rotation axis (6). Moreover, the crank head (2) includes a second horizontal bore (10), which, in the assembled configuration of the right crank arm, becomes aligned with the first horizontal bore (14) for receiving the elastic rotation axis. The crank head also includes a vertical bore (12) for receiving the lock axis (7). The crank arm (1) also comprises a lock device (4) that is easily moved down and upward with the user's thumb to release and lock the crank arm (1) between its operative and folded position. When the lock device (4) is pulled down a retaining spring (3) is compressed allowing the upper end of the lock axis (7) to flush with the crank arm hole (H) and releasing the crank arm (1) to rotate freely along its longitudinal plane with a 180° rotation angle in relation to the elastic rotation axis (6). Releasing the lock device (4) to its upper position it will lock the crank arm (1) at its folded position.

The assembly of the right crank of the present utility model further comprising an innovative fixation of the pedal-sprocket. The fixation of the pedal-sprocket on the head crank (2) is performed by means of a fastening nut (8) which fix the crank head (2) to any commercially available pedal-sprocket and to the left crank of the invention, as we can see from FIG. 4.

The crank of the present invention can also be used with any kind of pedal by simply attaching the pedal at the external end of the crank arm (1).

Note that when the crank arms (1) are rotated in a 180° angle (folded position), the pedal attached to the external end of the crank arm (1) will be directed towards the frame of the bicycle.

With the use of the proposed kit, it is possible to store three bicycles in the space normally occupied by one, with some extra space remaining. In extreme cases, it's even possible to store bicycles under conventional beds, which currently is completely impossible for a common bicycle.

That way, the user of any kind of bicycle could substitute, at any moment, the existing conventional handlebar and pedal-cranks for one of the kit described here, taking advantage of the above mentioned features. Therefore, this utility model, by means of this original handlebar and crank folding system, provides an effective gain in the reduction of space necessary for storing bicycle.

What is claimed is:

1. A right crank, comprising:

a crank arm (1) being arranged with the crank head (2) such that said crank arm (1) is able to rotate along its longitudinal plane with a 180° rotation angle, the crank arm (1) is connected to the crank head (2) through an elastic rotation axis (6) and a lock axis (7) having a reduced diameter (D) in the middle of said lock axis (7);

the crank arm (1) further comprises a lock device (4) that is connected to the push button (5) and both together are pressed to a retaining spring (3) which is inserted in the crank arm hole (H) allowing the middle part of the lock axis (7) to flush with the crank arm hole (H) and releasing the crank arm (1); and a fastening nut (8) to fix the crank head (2) to a pedal-sprocket.

* * * * *